(12) United States Patent
Schröder (10) Patent No.: US 6,487,946 B1
(45) Date of Patent: Dec. 3, 2002

(54) THREADING DEVICE

(75) Inventor: Ewald Schröder, Schloss Holte-Stukenbrock (DE)

(73) Assignee: Bitrek Corporation, Waynesboro, PA (US)

( * ) Notice: Subject to any disclaimer, the term of this patent is extended or adjusted under 35 U.S.C. 154(b) by 0 days.

(21) Appl. No.: 09/555,925

(22) PCT Filed: Oct. 5, 1999

(86) PCT No.: PCT/EP98/07355

§ 371 (c)(1),
(2), (4) Date: Jun. 6, 2000

(87) PCT Pub. No.: WO00/20153

PCT Pub. Date: Apr. 13, 2000

(30) Foreign Application Priority Data

Jun. 10, 1998 (DE) .......................... 198 45 948

(51) Int. Cl.⁷ ................................. B23G 1/04
(52) U.S. Cl. .............................. 82/110; 82/131; 82/113; 82/1.2; 408/153
(58) Field of Search ............. 409/73, 66, 78; 82/56, 58, 67, 83, 91, 1.4, 1.2, 70.2, 70.1, 72, 73, 100, 110, 131, 132, 139, 113; 408/153, 157; 407/36, 37, 44

(56) References Cited

U.S. PATENT DOCUMENTS 1,998,893 A * 4/1935 Cole et al. .................. 408/152
2,093,506 A   9/1937 Bartek
3,524,382 A * 8/1970 Artaud ......................... 407/45
4,387,612 A * 6/1983 Eckle et al. .................. 82/131
4,438,539 A   3/1984 Stephens
4,516,889 A * 5/1985 Ortlieb ........................ 408/152
5,098,232 A * 3/1992 Benson ........................ 407/33
5,120,167 A * 6/1992 Simpson ...................... 408/158
5,836,727 A * 11/1998 Scheer ........................ 408/158

FOREIGN PATENT DOCUMENTS

| DE | 112811 | 11/1899 |
| DE | 32 37 587 | 4/1984 |
| DE | 44 28 049 A1 | 8/1994 |
| DE | 195 00 515 | 7/1996 |
| EP | 0 593 222 | 4/1994 |
| FR | 2175776 | 10/1973 |

* cited by examiner

Primary Examiner—Henry Tsai
(74) Attorney, Agent, or Firm—Connolly Bove Lodge & Hutz LLP (57) ABSTRACT

A thread-cutting device with a thread-cutting head that rotates and includes a tool guide with at least two pairs of tool slides. The pairs of tool slides can shift radially relative to the axis of rotation and include cutting surfaces. The device also includes a propulsion element that rotates with the thread-cutting head. The propulsion unit includes spiral gear toothing that is indirectly or directly integrally engaged with the pairs of tool slides.

17 Claims, 8 Drawing Sheets

THREADING DEVICE

TECHNICAL DOMAIN

The invention relates to a thread-cutting device according to the preamble to patent claim 1.

STATE OF THE ART

In the case of a known thread-cutting device of this type (DE 44 28 049 A1), several toothed rods that exhibit, in each case, a radially inwardly-oriented oblique toothing, that is distributed across its circumference, are attached to a propulsion ring that is guided in such a way that it may be shifted axially. The spiral gearing meshes with a corresponding spiral gearing of transfer elements, which, in each case, simultaneously activate two tool slides in opposite directions. The propulsion, by way of a propulsion ring that is guided in such a way that it may be shifted axially has, on the one hand, the disadvantage that the toothed rods exhibit a relatively great distance from the axis of rotation. This generates a great structural volume of the thread-cutting head. On the other hand, the attachment of the toothed rod to a flange-like ring, which is attached only at the front, leads to the situation that the drive for the tool slide possesses a rigidity that is not, in all cases, sufficient. This can lead to imprecision in the processing of the work-piece.

In the case of another known solution (U.S. Pat. No. 2,093,506), too, propulsion is provided by means of an element in the form of a sleeve that is turned by means of a hollow shaft, whose central axis coincides with the axis of rotation, and which may be shifted in the axial direction by means of a hand lever that engages from the outside. When the axial shift occurs, the tool slides are advanced in a radial direction toward the axis of rotation.

In the case of this known solution, too, it is not possible to effect the motion of advancement by means of a central propulsion element.

THE INVENTION

Taking this state of the art as a point of departure, it is the underlying task of the invention to create a thread-cutting device that is constructed in a compact manner, which achieves, in the case of high production output, a high degree of processing precision, in which the advancement of the tool slides is possible by means of a centrally provided propulsion element.

The resolution of this task is accomplished with the characteristics of patent claim 1.

The embodiment according to the invention renders possible a compact and very rigid mode of construction of the thread-cutting device so that the radial, controlled repositioning of the tools can be accomplished very precisely, and its guiding can be accomplished in a manner involving a particularly low degree of oscillation. The embodiment according to the invention renders it possible to use thread-cutting tools and turning or rough-turning tools, as well as combined tools made of hard metal on each processed work-piece.

In the case of a particularly preferred embodiment form, the transfer of the axial motion of the propulsion element is accomplished directly onto the tool slide that is guided in a radially movable manner. By these means, the number of the parts, and thus, the amount of treasure and energy expended is less, when compared with the state of the art while, simultaneously, an enhanced degree of precision is produced.

Additional preferred embodiments of the invention result from the subsidiary claims.

BRIEF DESCRIPTION OF THE DRAWINGS

In what follows, two preferred embodiment forms are elucidated in detail by virtue of the drawings.

BEST WAY FOR EXECUTING THE INVENTION

In the drawings, identical parts, or parts that correspond to one another, are, in each case, equipped with identical reference symbols. They are distinguished from one another, if necessary, by prime marks.

The thread-cutting device consists, substantially, of a thread-cutting head, 1 and a propulsion element that turns at the same speed as the thread-cutting head 1 around an axis of rotation, 1a. As a result of relative motion that occurs between the thread-cutting head and the propulsion element in the direction of the axis of rotation, tool slides bearing the tools are moved radially, inward or outward.

Figure 1:
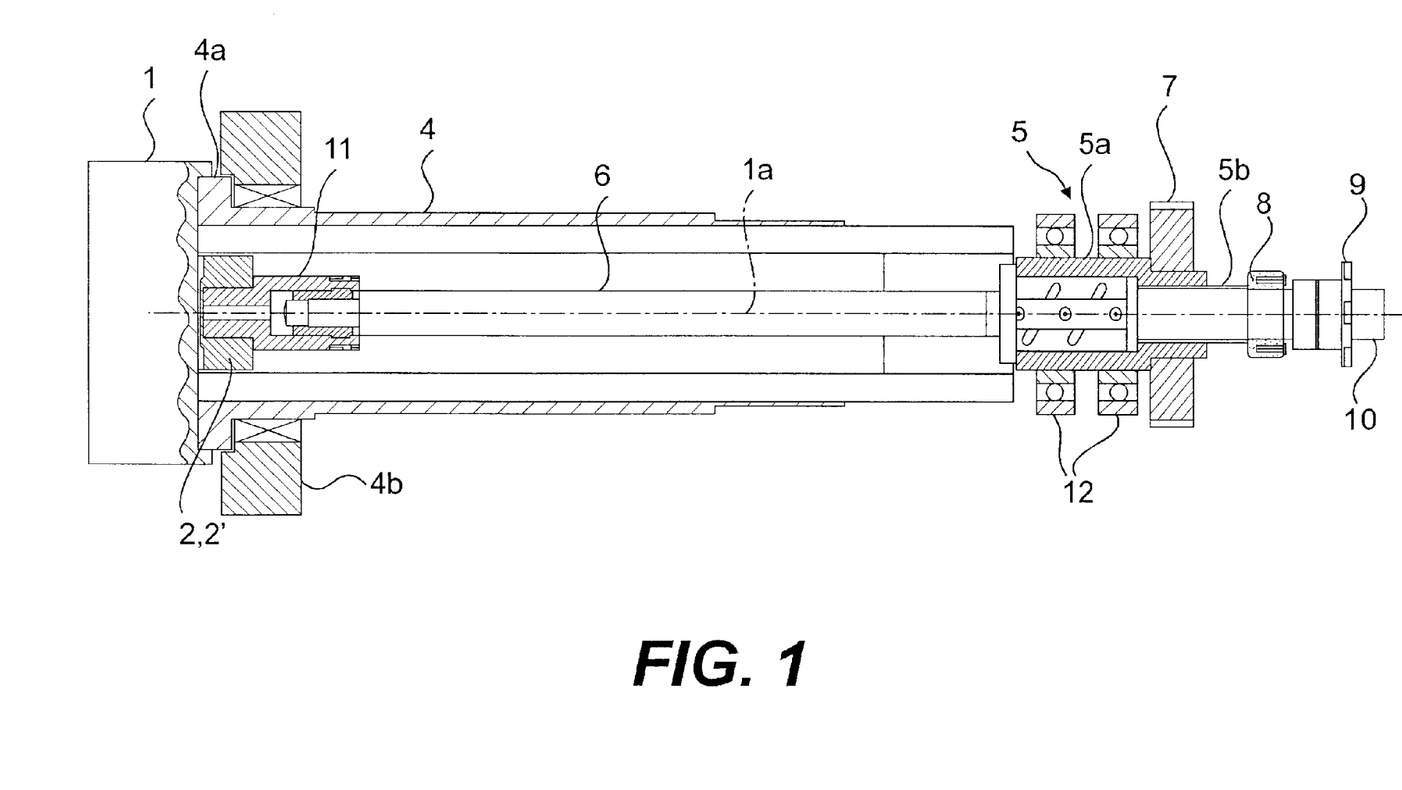
FIG. 1 shows a partially sectioned lateral view of a thread-cutting device with the propulsion unit for the radial advancement of the tool slide.

An exemplary total structure is shown in FIG. 1.

The thread-cutting head 1, of which only the external circumference is shown, is attached to the spindle flange 4a of a tool spindle 4. The tool spindle 4 and the thread-cutting head 1 rotate around a commonly shared axis of rotation 1a. The tool spindle 4 is seated in a housing 4b only a portion of whose front wall is shown. The housing 4b can be moved, together with tool spindle 4 and the thread-cutting head 1, in the direction of the axis of rotation 1a. The tool spindle 4 is transfixed by a non-rotating drawbar 6, which is, however, capable of being shifted longitudinally, relative to the tool spindle 4. In order to transfer the longitudinal advance of the drawbar 6, which does not rotate, to the rotating propulsion element 2 or 2', respectively, a carrier coupling 11 is provided between propulsion element 2 or 2', respectively, and the drawbar 6.

In the housing 4b, the spindle nut 5a of an internally threaded drive 5, which may be moved with the housing 4b, is seated with ball bearings 12 so as to be capable of rotation. The spindle nut is propelled by a numerically controlled motor that is not shown by way of synchronous belt drive, 7. The spindle nut 5a engages a ball screw spindle 5b. The rotation of the spindle nut 5a on the ball screw spindle 5b, which is held so as to be incapable of rotation, causes a shift of the ball screw spindle 5b and the drawbar 6 which is embodied with it, relative to the tool spindle 4 and the thread head 1 in the direction of the axis of rotation 1a. The ball screw spindle 5b is connected with a multi-splined shaft 10 which is held with a flange 9 so that its axial position may shift, but it cannot rotate, by way of a compensating coupling 8. As a result, the threaded spindle 5b and the drawbar 6 cannot rotate, but their position can be shifted in the longitudinal direction of the tool spindle 4 and relative to it.

Figure 2:
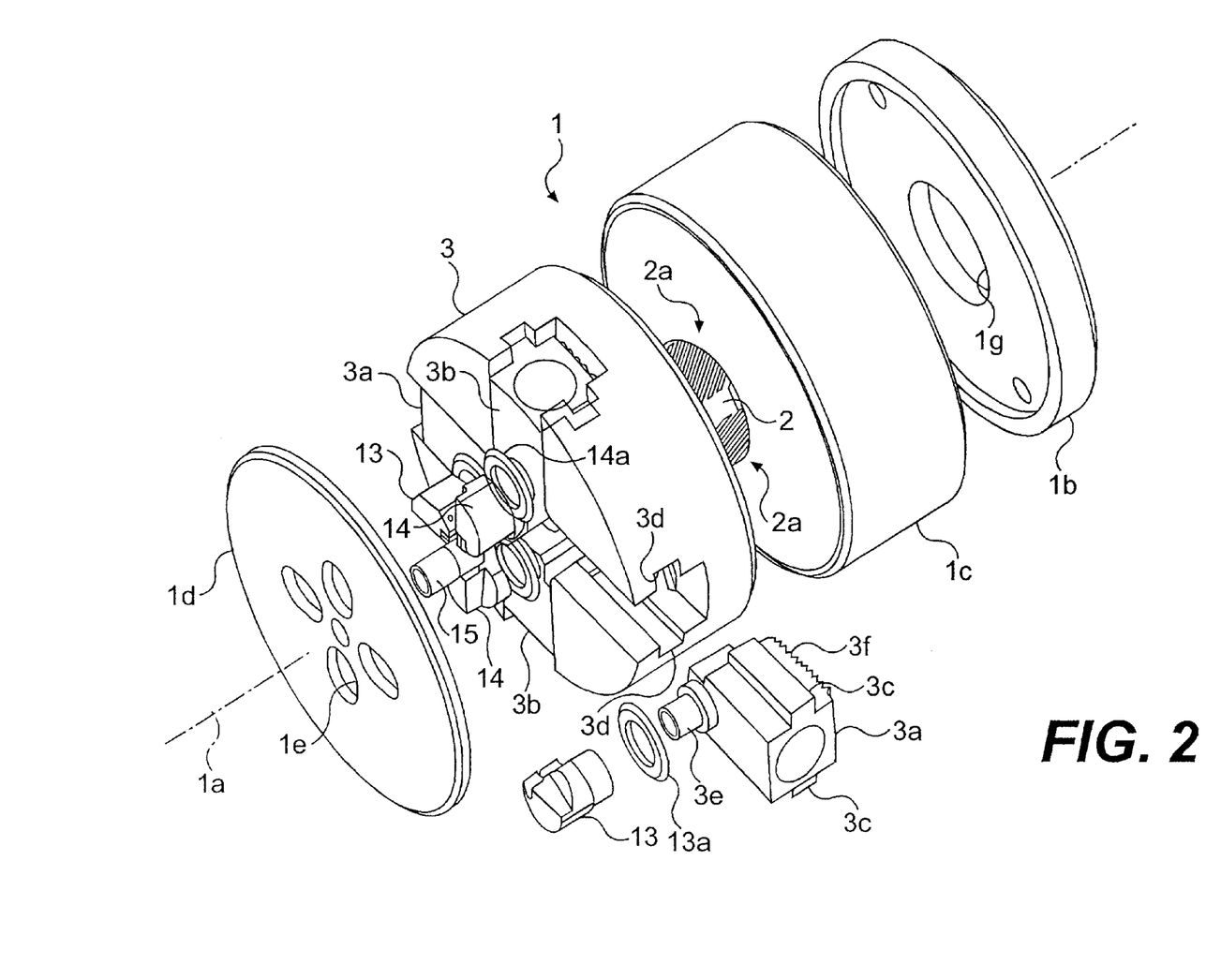
FIG. 2 shows an exploded representation, in perspective, of an initial embodiment form of the thread-cutting device.
Figure 3:
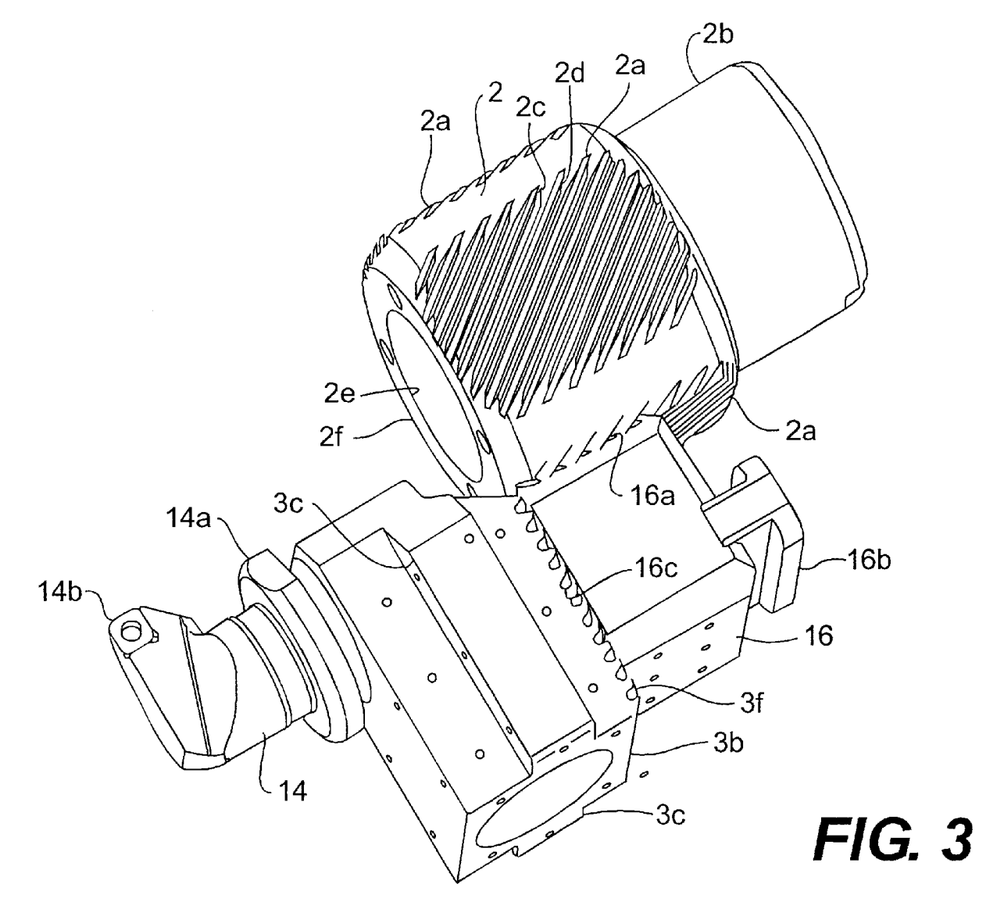
FIG. 3 shows a constituent area of the thread-cutting device according to FIG. 2, in a state of assembly that is shown in perspective.

An initial embodiment form of the thread-cutting device with an indirect transposition of the longitudinal shift of the propulsion element 2 into a radial shift of the tool slides 3a and 3b is described in what follows by virtue of FIGS. 2 and 3.

A securing flange 1b serves to secure the thread-cutting head 1 to spindle flange 4a of tool spindle 4. A basic body 1c, which covers the propulsion element 2 and connects a tool guide 3 with securing flange 1b so as to be proof against rotation, is adjacent to the securing flange 1b. The front of the tool guide body 3 is covered by a cover plate 1d, which exhibits long holes 1e through which the frontal parts of the tool slides 3a and 3b pass.

In tool guide body 3, four tool slides 3a and 3b are offset at 90° relative to each other and they are arranged so that their position may be shifted radially. The tool slides 3a and 3b possess lateral guide lands 3g, which are led into the guide grooves 3d in the tool guide body 3. For the purpose of securing tool holders 13 for thread-cutting tools 13b, or securing tool holders 14 for turning tools or rough-turning tools 14b to the tool slides 3a or 3b, respectively, these tool slides are equipped with tightening journals 3e in each case. Between the tool slides 3a and the tool holders 13 or between the tool slides 3b and the tool holders 14, spacer discs 13a or 14a, respectively, are pushed onto the tightening journal 3e which protect the tightening area of tightening journal 3e from shavings and liquid coolant and establish the length of projection of the thread-cutting tools 13b and of the turning tools 14b.

The cutting edges of the turning tools 14b are arranged ahead of the cutting edges of the thread-cutting tools 13b in the direction of processing. The cutting edges of the turning tools 14b, which are arranged on the tool slides that are on the opposite sides 3b, are offset against one another in the direction of processing by the depth of cut.

The cutting edges of the thread-cutting tools 13b, which are also attached to opposing tool slides 3a, are offset against one another in the direction of processing by half the pitch of the thread. All tools 13b and 14b simultaneously process the work-piece 15, which is held, in a manner not shown, so as to be incapable of rotation and incapable of being shifted and whose central axis is in alignment with the axis of rotation 1a.

The transformation of the longitudinal motion of the propulsion element 2 into a radial motion of the tool slides 3a and 3b is accomplished with the aid of four transfer elements 16 (FIG. 3). Each transfer element 16 has, substantially, the form of a cube and is equipped, on two planes that are adjacent to one another, with spiral gear toothing 16a and 16c. The spiral gear toothing can exhibit various tooth forms, and can consist, in each case, of one or more teeth. The propulsion element 2 of the thread-cutting head 1 bears spiral gear toothing 2a on four sides that are offset relative to one another at 90°, arranged on a commonly shared central area 2f that meshes with the transverse gear teeth 16a of transfer elements 16. The flanks of the teeth of spiral gear toothing 2a form initial guiding surfaces 2c for the radial advance of tool slides 3a and 3b, whereas the opposing tooth flanks form second guiding surfaces 2d for the withdrawal of the tool slides 3a and 3b. The abutting tooth flanks of the spiral gear toothing 16a form surfaces that are opposite to the guiding surfaces 2c and 2d.

The propulsion element 2 possesses a sleeve 2b that is molded on, with which it is attached to the drawbar 6 so as to be capable of rotation, by way of the carrier coupling 11. A central bore-hole 2e in the propulsion element permits the insertion of long work-pieces 15 during processing.

The transfer elements 16 are screwed together with a T-shaped guide piece 16b which guides the transfer elements 16 to the propulsion element 2 in the tool acceptance unit 3 in such a way that they can be shifted tangentially. On the surface that lies opposite the tool slides 3a and 3b, the transfer element 16 bears the spiral gear toothing 16c, which meshes with the spiral gear toothing 3f of the tool slides 3a and 3b. The sets of spiral gear toothing 16a and 16c are arranged on surfaces of the cube-shaped transfer element 16 that run adjacent to, and at right angles to one another.

Figure 4:
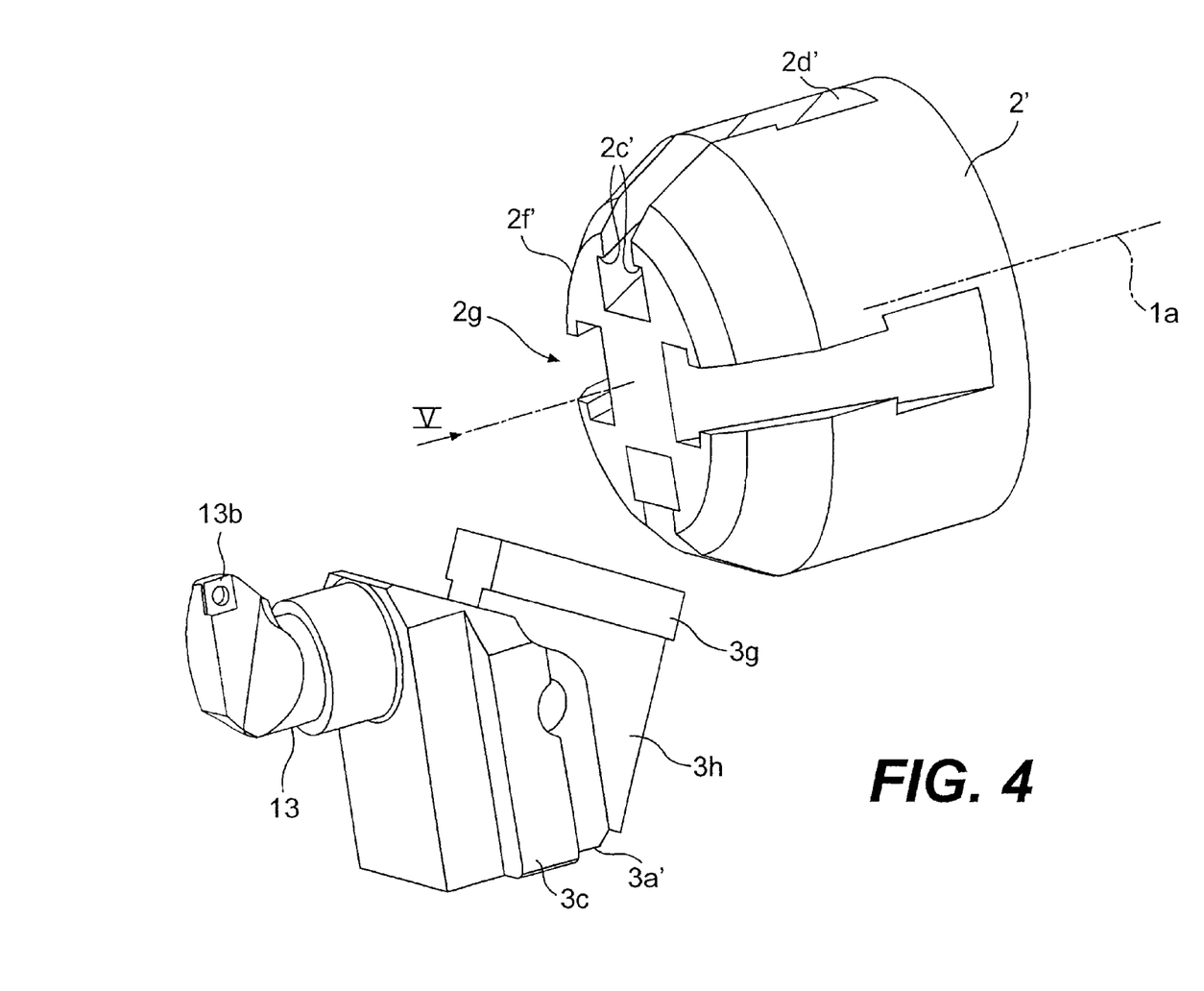
FIG. 4 shows an exploded representation, in perspective, of a constituent area of a second embodiment, which shows a propulsion element and one of several tool slides.
Figure 5:
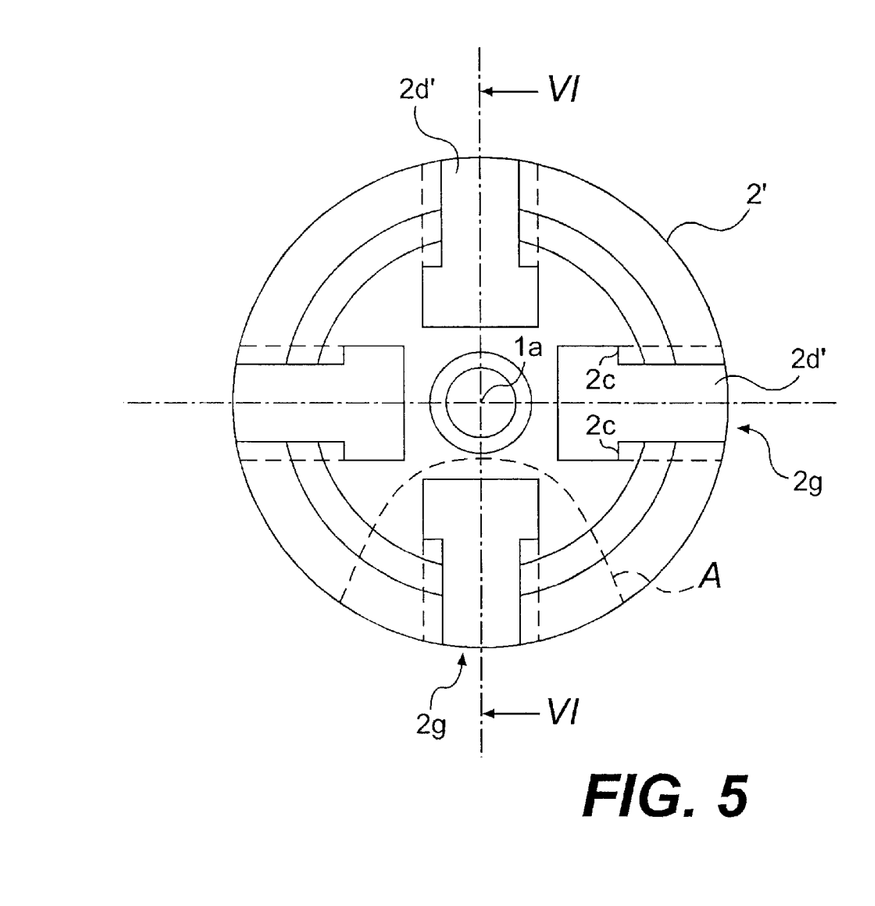
FIG. 5 shows a frontal view, in the direction of the arrow V in FIG. 4.
Figure 6:
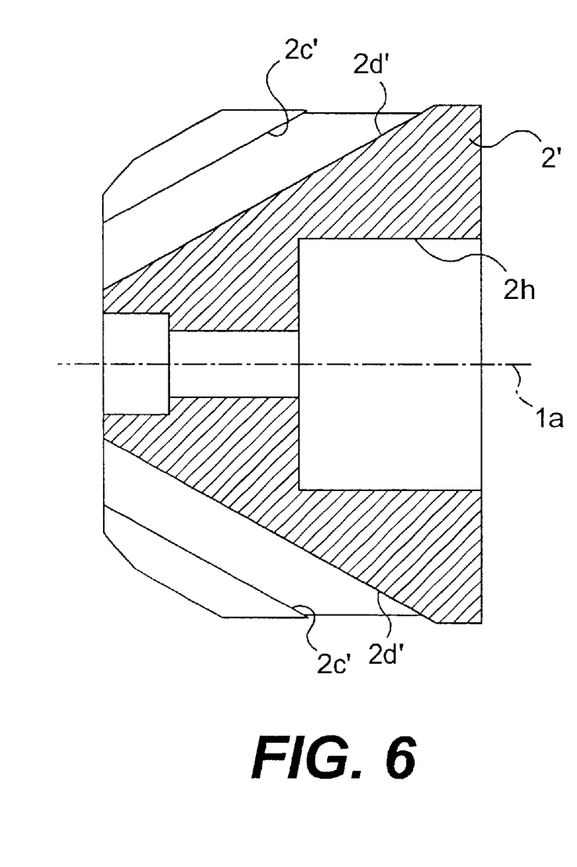
FIG. 6 shows a section through the propulsion organ according to FIGS. 4 and 5 along the section plane VI—VI in FIG. 5.

A second embodiment form of a thread-cutting head is described below. FIG. 4 represents the critical elements in which the second embodiment form differs substantially from the first. In the case of this second embodiment form, the relative axial motion between the propulsion element 2' and the thread-cutting head 1 is directly transformed into a radial motion of the tool slides 3 a'.

The propulsion element 2' of thread-cutting head 1 exhibits initial guiding surfaces 2c' and second guiding surfaces 2d' on flat guides 2g that have the form of a T-shaped groove, which are uniformly distributed along the circumference, around a central area 2f' and which run in the propulsion element 2' ascending obliquely toward the exterior. Four flat guides are provided in the propulsion element 2', two of which 2g in each case lie opposite each other. The flat guides 2g are arranged in an offset manner, at 90° to each other.

Figure 10:
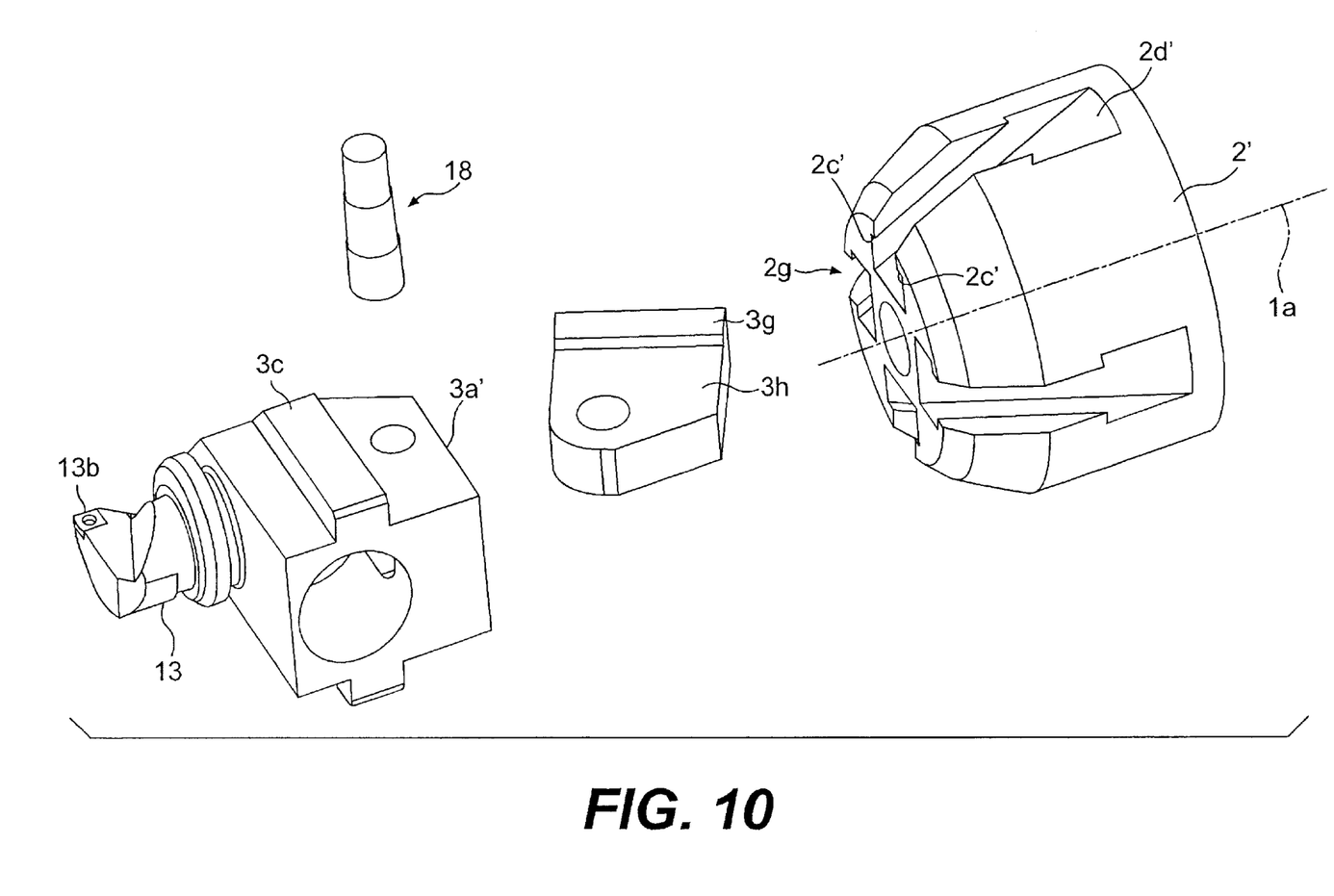
FIG. 10 shows an exploded view, in perspective, of the second embodiment, which is shown in FIG. 4, which also shows the tool slide in exploded view.

In the flat guides 2g, guiding bodies 3g with appropriately embodied profiles are seated so as to be capable of being shifted, which bear the opposing surfaces to the guiding surface 2c' and 2d'. Each guiding body 3g is connected via a land 3h by means of an eccentric bolt 18 (cf. FIG. 10) with a tool slide 3a'. The tool slide 3a' is guided with lateral guide lands 3c in the thread-cutting head 1 so as to be capable of radial shift. As a result of providing an eccentric bolt 18 between the tool slide 3a' and the land 3h, each tool may undergo fine adjustments.

Figure 11:
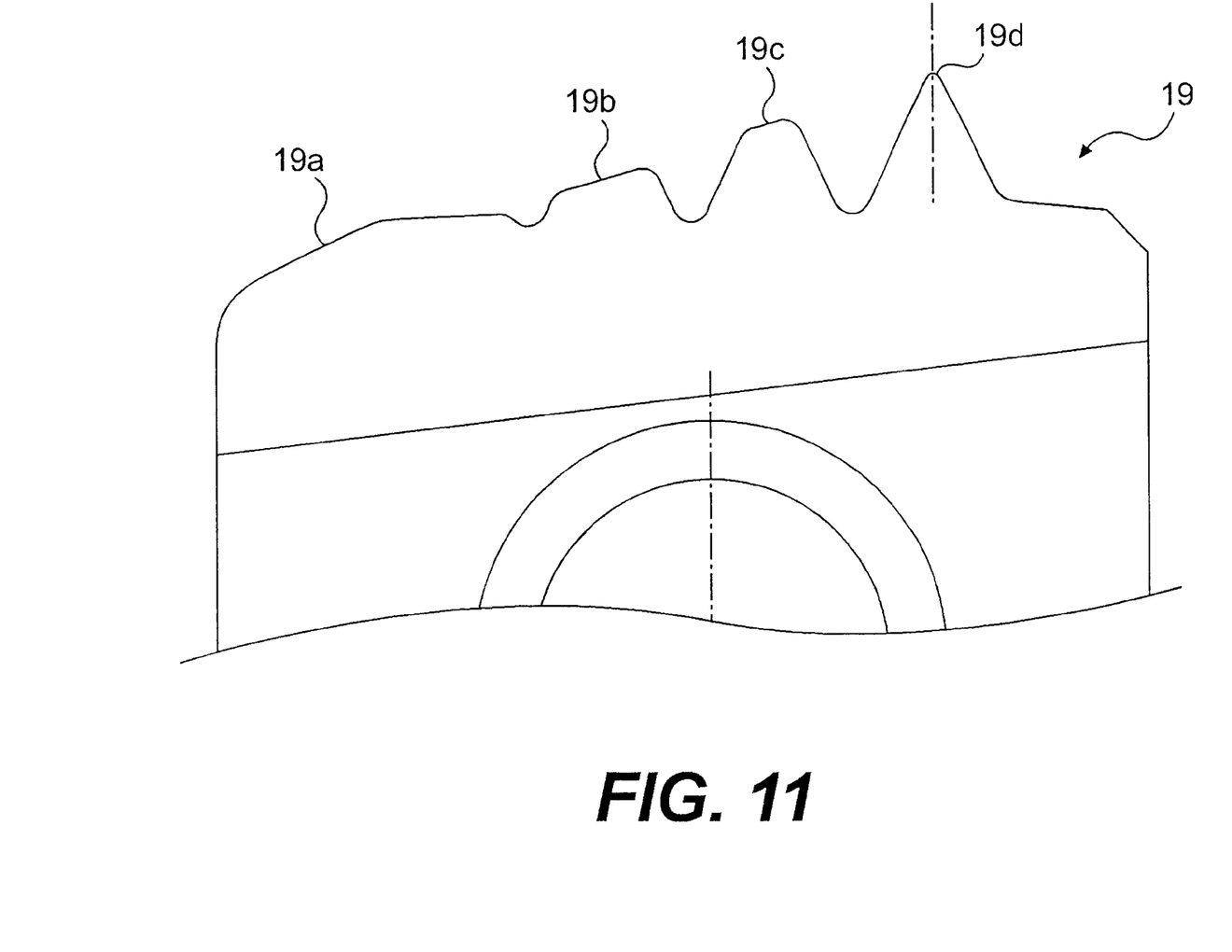
FIG. 11 shows a constituent area of a combined rough-turning and thread-cutting tool, made of hard metal.

Instead of the turning and rough-turning tools 14b, which are embodied separately, or the thread-cutting tools 13b, respectively, combined tools made of hard metal, as they are designated in FIG. 11 with the number 19, may be used as well. On the front side of such combined tools 19, a cutting edge for rough-turning 19a is provided. Adjacent to the cutting edge for rough-turning, 19a, there are two preliminary cutting areas 19b and 19c, behind which lies the final cutting area 19d.

The shifting of the propulsion element 2' in the direction of processing gives rise to a radially outwardly directed motion of the tool slide. The shifting of the propulsion element 2' contrary to the direction of processing, moves the tool slide 3' radially, in the direction of the work-piece 15.

The guide body 2' exhibits a graduated securing bore-hole 2h which accepts a shoulder of the carrier coupling, 11.

Figure 7:
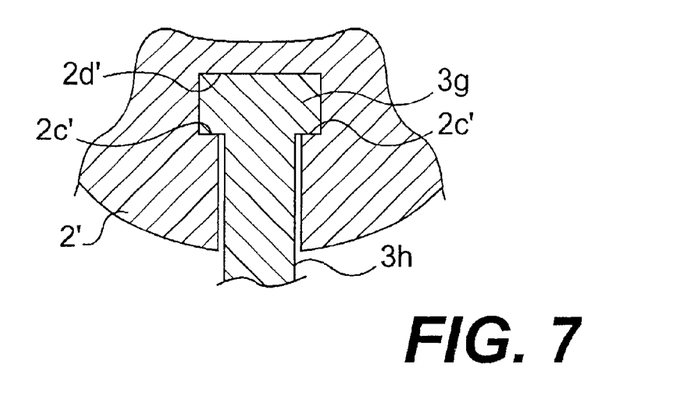
FIG. 7 shows a constituent area of the propulsion element according to cut-out A in FIG. 5, in cross-section, with an embodiment of the guide of the tool slide as a flat guide.
Figure 8:
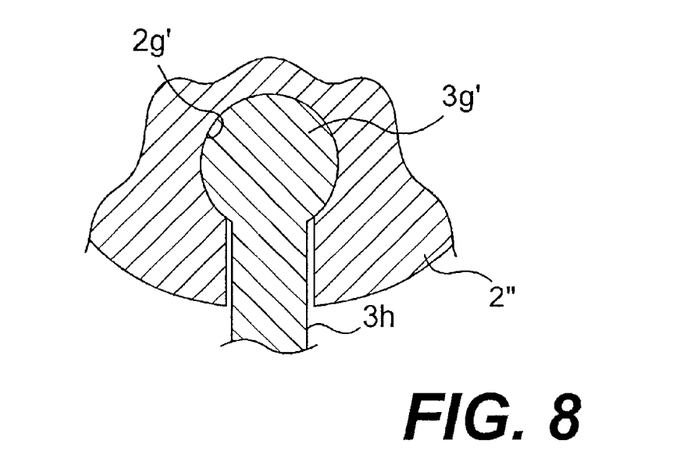
FIG. 8 shows a constituent area of the propulsion element according to cut-out A in FIG. 5, in cross-section, with an embodiment of the guide of the tool slide as a round guide.
Figure 9:
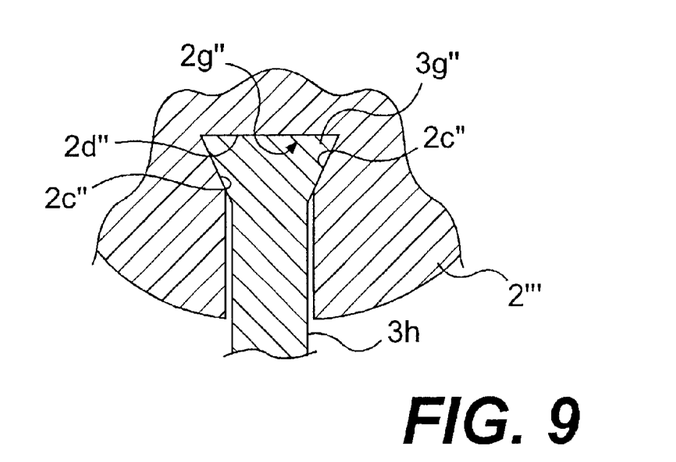
FIG. 9 shows a constituent area of the propulsion element according to cut-out A in FIG. 5, in cross-section, with an embodiment of the guide of the tool slide as a swallow-tail guide.

The guiding surfaces and guiding bodies can exhibit various configurations for the purpose of transforming the longitudinal motion of the propulsion unit. Preferred embodiment forms of the guiding surface are shown in the partial cut-out segments that are depicted in FIGS. 7 through 9 for the various guiding bodies 3g, 3g' and 3g".

In addition to the flat guide 2g, round guides 2g' and swallowtail guides 2g" lend themselves to the acceptance of guiding bodies 3g, 3g', and 3g". In the process, the guiding surfaces are formed by areas of the slotted round guides 2g' in the propulsion element 2". In the case of the swallowtail guide 2g" in the propulsion element 2''', the lateral surfaces, which are inclined toward one another, function as initial guiding surface 2c" and the expanded basic surface functions as a second guide surface 2d".

As a result of the arrangement of the tool slides 3a, 3a' and 3b on tool head 1 as pairs, the passive forces that work upon the tools 13 and 14 in thread-cutting head 1 cancel each other out in large measure, so that the seating of the tool spindle 4 in a radial direction is not, in practical terms, placed under any burden, and a high degree of processing precision results. In addition, more than four tool slides 3a, 3a', and 3b can be provided, but the number will always be an even one, preferably.

What is claimed is:

1. A thread cutting device comprising a rotating thread-cutting head (1) that can shift in the direction of the axis of rotation (1a), and includes a tool guide with at least two pairs of tool slides (3a; 3b), wherein the pairs of tool slides can shift radially relative to the axis of rotation (1a) through integral contact with a propulsion element that rotates with the thread-cutting head, the propulsion element includes spiral gear toothing having guiding surfaces on four radial sides offset relative to one another by 90°, wherein the rotational motion of the propulsion element is transferred, indirectly or directly, to each tool slide of the pairs of tool slides.

2. The device according to claim 1, wherein the guiding surfaces are oriented toward the outside and run in a plane parallel to the axis of rotation (1a) at an angle oblique to the axis of rotation (1a).

3. The device according to claim 1, wherein the guiding surfaces are oriented toward the outside and run at an oblique inclination relative to the axis of rotation (1a).

4. The device according to claim 1, wherein the guiding surfaces include first guiding surfaces for directing the tool slides in an one direction and second guiding surfaces that run parallel to and lie opposite the first guiding surfaces for directing the pairs of tool slides in an opposite direction.

5. The device according to claim 4, wherein the first guiding surfaces and the second guiding surfaces are flat surfaces of a T-shaped flat guide (2g), which integrally connects with a guiding body (3g), that is connected to each tool slide of the pairs of tool slides.

6. The device according to claim 5, wherein the guiding body includes an integrally connecting element having a cross-sectional shape selected from the group consisting of a rectangle, a cylinder, and a trapezoid.

7. The device according to claim 4, wherein the initial guiding surfaces and the second guiding surfaces are the sides of a spiral gearing (2a), which lie opposite one another at the outside of the propulsion element (2).

8. The device according to claim 4, wherein the propulsion element includes spiral gearing integrally connected with the gear toothing (16a) of transfer elements (16), the transfer elements adapted to shift tangentially in a direction co-linear with the rotational axis, the transfer elements further comprising spiral gearing (16c) that integrally connects with gear toothing (30 on each tool slide of the pairs of tool slides.

9. The device according to claim 1, further comprising thread-cutting tools (13) or turning or rough-turning tools (14) having one or more cutting edges attached to one or more of the pairs of tool slides.

10. The device according to claim 9, wherein the one or more cutting edges of the thread-cutting, or turning or rough-turning tools are adjustable in the direction of the axis of rotation.

11. The device according to claim 10, wherein the one or more cutting edges are adjusted by means of an eccentric bolt (18) that connects a guiding body to each tool slide of the pairs of tool slides.

12. The device according to claim 1, wherein one pair of the at least two pairs of tool slides is equipped with thread-cutting tools (13) and another pair is equipped with turning or rough-turning tools (14).

13. The device according to claim 12, wherein the thread-cutting tools are arranged opposite one another, and the turning or rough-turning tools are arranged opposite one another.

14. The device according to claim 12, wherein the thread-cutting tools and the turning on rough-turning tools are offset from one another in the direction of the axis of rotation, the cutting edge of the turning or rough-turning tools are disposed in front of the cutting edge of the thread-cutting tools.

15. The device according to claim 1, wherein each tool slide of the pair of tool slides include both rough-turning and thread-cutting tools (19).

16. The device according to claim 1, wherein the propulsion element (2) includes a central bore-hole (2e).

17. The device according to claim 1, wherein the propulsion element shifts axially by means of an internally threaded drive (5) connected to a drawbar (6) disposed within a tool spindle (4) that secures the thread-cutting head (1).

* * * * *